United States Patent [19]

Anderson

[11] Patent Number: 4,691,645
[45] Date of Patent: Sep. 8, 1987

[54] SEED PLANTER ATTACHMENT

[76] Inventor: Steven Anderson, Star Route, Arlington, Oreg. 97812

[21] Appl. No.: 752,036

[22] Filed: Jul. 5, 1985

[51] Int. Cl.⁴ .............................................. A01C 5/08
[52] U.S. Cl. ....................................... 111/86; 111/73
[58] Field of Search ............................ 111/80, 85–87, 111/7, 52, 73; 403/252, 254, 245, 393

[56] References Cited

U.S. PATENT DOCUMENTS

| | | | |
|---|---|---|---|
| 488,072 | 12/1892 | Howard | 111/85 |
| 1,650,194 | 11/1927 | Deasry | 403/245 |
| 2,159,652 | 5/1939 | Brunner | 111/73 |
| 2,318,224 | 5/1943 | Hyland | 111/83 |
| 2,764,111 | 9/1956 | Collins | 111/86 |
| 2,818,036 | 12/1957 | Phillips | 111/87 |
| 3,083,542 | 4/1963 | Summers et al. | 111/73 |
| 4,278,036 | 7/1981 | Buchele | 111/85 |
| 4,520,742 | 6/1985 | Anderson | 111/85 |

FOREIGN PATENT DOCUMENTS 2117135 10/1971 Fed. Rep. of Germany ........ 111/80

Primary Examiner—James R. Feyrer
Attorney, Agent, or Firm—Chernoff, Vilhauer, McClung & Stenzel

[57] ABSTRACT

An improved seed planter for a chisel plow includes a boot connected by a pair of leaf spring rods to the vertical shank of the plow. A bracket for connecting the spring rods to the boot and for gauge or press wheel attachments is detachably coupled to the rear of the boot by a quick-releasing pin that engages apertures in tabs affixed to the boot. The tabs mate with slots on the bracket. Thus, the depth of the boot may be regulated independently of the spring rod bias.

7 Claims, 3 Drawing Figures

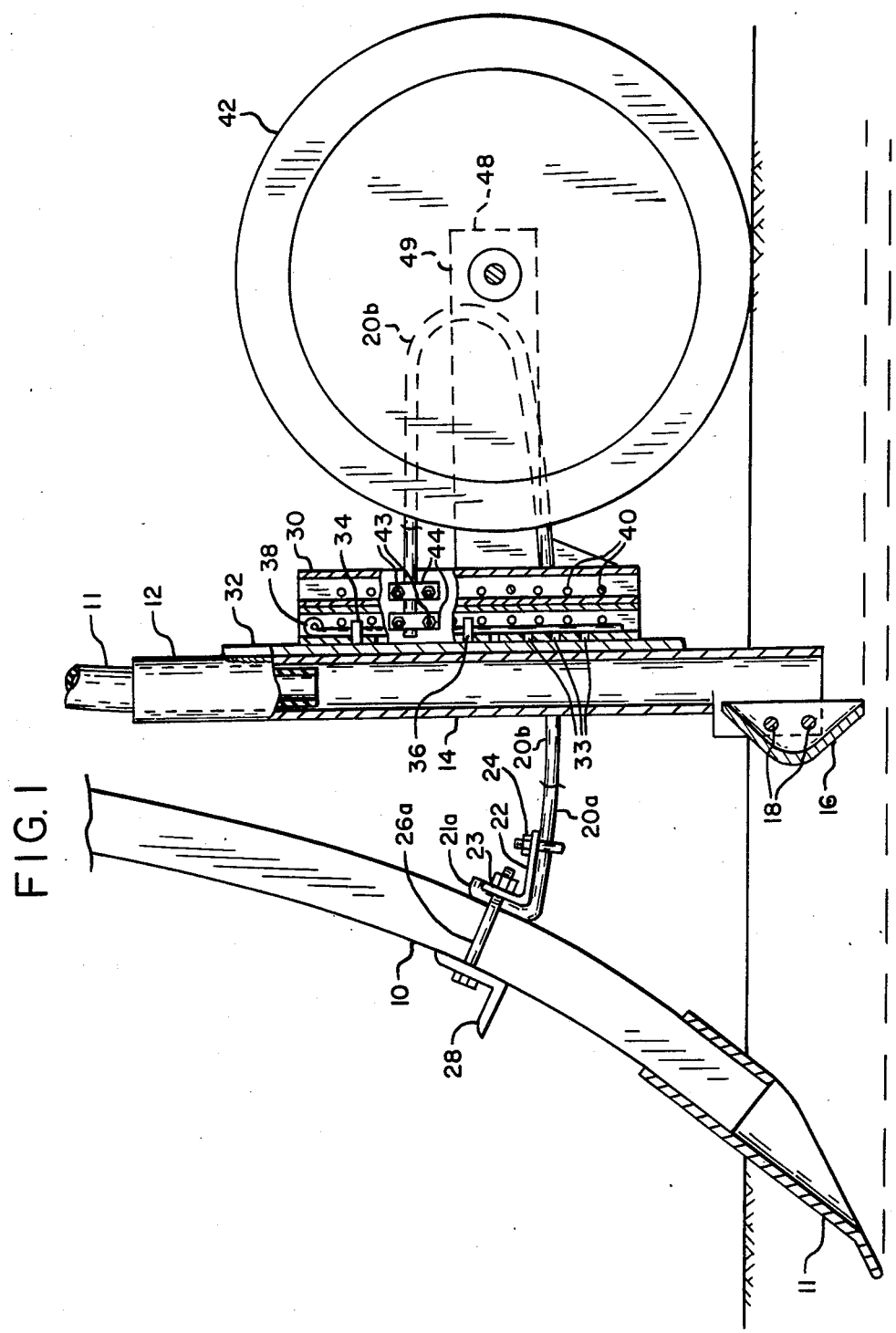

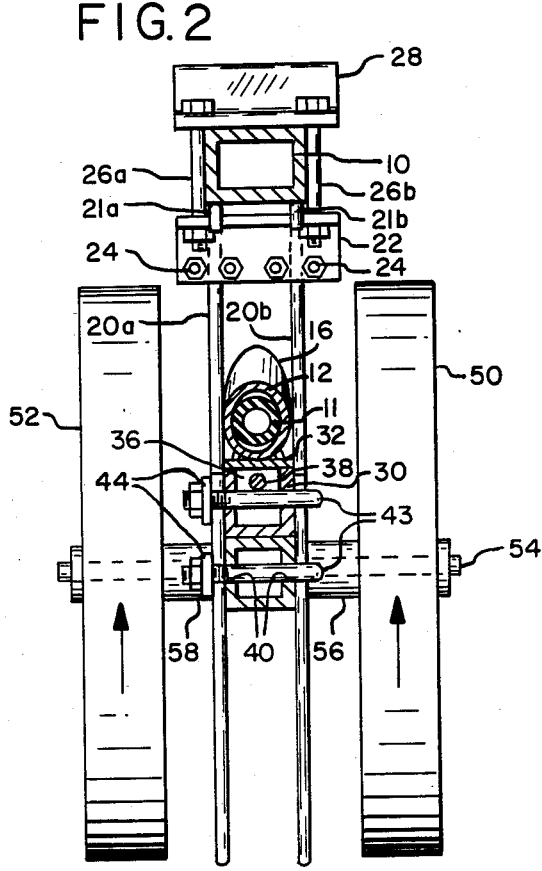
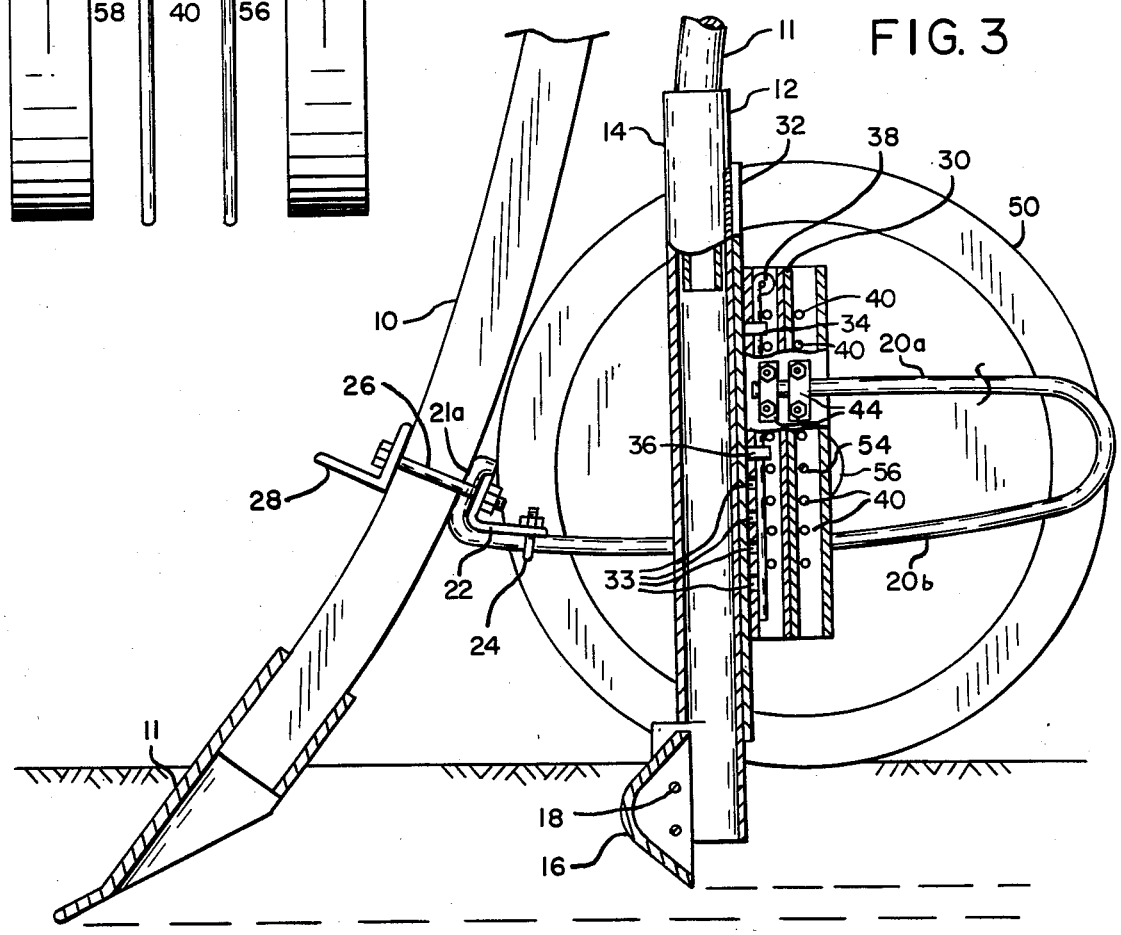

SEED PLANTER ATTACHMENT

BACKGROUND OF THE INVENTION

The present invention relates to an improved seed planter attachment of the type described in my U.S. Pat. No. 4,520,742 which issued on June 4, 1985, entitled "Seed Planter Attachment for Chisel Plow" which is incorporated herein by reference.

No-till farming methods conventionally employ chisel plows which are elongate pointed chisels mounted to the undercarriage of a frame which has wheels and is adapted to be drawn behind a tractor or the like. In my copending application, referred to above, there was described a seed planter attachment for a chisel plow in which the seed planter is resiliently mounted to the chisel plow by means of a leaf spring rod attached to the shank of the chisel plow at any vertical location along the length thereof. The other end of the leaf spring rod supported a seed planter boot which included a fixed mounting bracket for the attachment of gauge depth wheels for regulating the vertical height of the boot. In that design the gauge depth wheels were connected to the bracket on the seed planter boot by means of a slot-engaging U-bolt which gripped the axle of the gauge depth wheels. An elongate pin was inserted through the loops of the U-bolt on the inside of the bracket to hold the axle in place. This arrangement, however, is awkward and time-consuming if modifications must be made in the field to the height of the seed planter attachment. Moreover, the design did not accommodate a single press wheel adapted to be towed in the wake of the boot to press the seeds firmly into the ground.

The bracket for the attachments of the leaf spring rod and the gauge depth wheels was fixedly mounted to the seed guide boot through which seeds were dropped from a seed-dispensing mechanism on the frame. The seed boot also included a foot for creating a narrow furrow for the seeds that followed in the wake of the chisel plow. The depth of the boot, however, could not be regulated independently of the gauge wheels. This is because any changes in the vertical height of the boot relative to the gauge wheels would necessitate a corresponding change in the position of the leaf spring rod either along the shank of the plow or along the bracket fixedly mounted to the seed planter boot. One could not provide for a change in the seed planting depth while attempting to maintain the same ground-engaging bias for the gauge wheels provided by the leaf spring rod. Moreover, the design of the foot did not provide the maximum advantage to be obtained for such a ground-engaging tool preceding the seed boot. Since the distance between the seed boot and the plow shank may be adjusted by sliding the seed tube and its associated bracket backwards and forwards along the horizontal portion of the curved spring rod, more efficient designs of the foot could be used to work the soil prior to seed planting.

SUMMARY OF THE INVENTION

The present invention provides an improvement to the aforementioned design by including a mounting bracket selectively detachably coupled to the seed planter boot through which a depth adjustment to the boot may be made independently of any ground-engaging bias set by the gauge depth wheels and the leaf spring rod. A seed planter tube from a manifold on the frame is inserted into the boot which may be in the form of an elongate cylinder. The boot includes a flat metal plate fixedly attached to the rearwardly-facing portion of the cylinder and a soil-working foot attached to the front of the cylinder. The flat plate includes a pair of tabs having vertically aligned apertures. These tabs protrude through vertically-spaced slots on a detachably coupled bracket which includes mounting holes for the rear end of the leaf spring rod and for a rearwardly-depending bracket supporting a single press wheel. Dual guage depth wheels may also be mounted directly to the bracket by a bolt which passes through a pair of apertures. Spacers between the wheels and the bracket separate the wheels from the bracket outwardly of the leaf spring rods. When the tabs of the plate engage the slots on the bracket, an elongate pin may be inserted through the apertures in the tabs thereby snugly holding the bracket to the rear plate. Since the plate is flat and the bracket is rectangular there is no wobbling of the boot from side to side. Thus, the adjustment of the spring rod bias which regulates the force of the press wheel or gauge depth wheels against the ground may be set independently of the seed planting depth. The boot may be decoupled from the wheels and the planting depth may be adjusted in the field without the necessity of disassembling the entire attachment to make several adjustments with small attaching parts which may become lost. The foot mounted to the front of the cylinder may include a crescent-shaped blade as opposed to a pointed prow for pressing the topsoil underneath the boot thereby making a channel and pressing the fertilizer into the soil prior to the deposit of a seed.

It is a primary object of this invention to provide an improved seed planter attachment having a detachable mounting bracket by which the seed depth may be regulated independently of the ground-engaging bias of the gauge wheels.

A further object of this invention is to provide an improved seed planter attachment having provision for detachably mounting either a single press wheel or a pair of gauge depth wheels.

A further object of this invention is the provision of a detachable mounting for a seed planter attachment which does not require the disassembly of small attaching parts.

Yet a further object of this invention is to provide an improved seed planter attachment having enhanced structural rigidity so that the seed planter attachment follows more precisely in the wake of the chisel plow.

A still further object of this invention is to provide an improved foot for a seed planter attachment capable of more efficient prepration of the soil for planting.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side cutaway view of a seed planter attachment for a chisel plow including a single press wheel mounted on a rearwardly depending bracket.

FIG. 2 is a top view of the seed planter attachment of FIG. 1 showing a mounting for dul gauge depth wheels.

FIG. 3 is a side cutaway view of the seed planter attachment of FIG. 2.

DETAILED DESCRIPTION OF THE INVENTION

A seed planter attachment for a chisel plow 10 includes a boot 12 including a substantially cylindrical seed guide 14 into which a hollow seed tube 11 is inserted which is attached to a manifold on a frame (not shown). An earth working foot 16 may be attached to the cylinder 14 by means of bolts 18, and as such, different types of foot may be used as desired. The foot 16 is crescent-shaped and serves to close the soil over the fertilizer which is injected through a tube (not shown) on the chisel plow 10 prior to the deposit of seeds in the ground. Thus the seeds are insulated from the fertilizer by a layer of soil, and this will prevent burning of the seeds by the fertilizer. The chisel plow 10 includes a knife portion 11 which breaks the ground without tilling or turning over the soil. Fertilizer is injected through a tube (not shown) which extends along the shank of the chisel plow 10 and ends at the tip of the knife 11. This fertilizer is usually in the form of a liquid which is dispensed from a vessel under pressure located on the frame of the plow (not shown). The boot 12 is connected to the chisel plow 10 by means of a pair of leaf spring rods 20a and 20b. The leaf spring rods 20a and 20b are held against the chisel plow 10 by means of a clamp bracket 22. U-bolts 24 clamp a straight portion of the spring rods 20 to the bracket 22 while angled portions 21a and 21b of the leaf spring rods 20a and 20b are clamped to the chisel plow 10 by bolts 26a and 26b which extend from a guard plate 28 on the opposite side of the chisel plow 10 through holes in an angled portion 23 of the bracket 22. The guard plate 28 prevents soil from accumulating on the front face of the chisel plow 10 thus helping to keep the topsoil broken by the knife 11 concentrated in the area of the furrow created by the knife 11. Otherwise, soil would tend to creep up the front inclined face of the chisel plow 10 and accumulate thereon impairing the efficiency of the plow and scattering the topsoil away from the area where the furrow is to be created.

The leaf spring rods 20a and 20b are connected to a mounting bracket 30 which is detachably coupled to a metal plate 32 welded to the rear of cylinder 14. The metal plate 32 includes a pair of tabs 34 and 36 which engage slots 33 on the front of the bracket 30. The tabs 34 and 36 have vertically aligned apertures so that when the tabs are inserted through appropriate slots 33 which are spaced vertically all along the length of bracket 30, the bracket may be held in place by inserting an elongate pin 38 through the apertures of the tabs 34 and 36 thereby snugly holding the bracket 30 to the back of the metal plate 32.

The bracket 30 includes double rows of apertures 40 on either side for attachment of both the leaf spring rods 20a and 20b and for gauge or press wheels such as single press wheel 42. The leaf spring rods 20a and 20b are connected to the bracket 30 by means of U-bolts 43 insertable through apertures 40 on opposite sides of the bracket 30. The loops of the U-bolts 43 clamp one of the leaf spring rods 20b and rectangular metal plates 44 clamp the other of the leaf spring rods 20a A double pair of both U-bolts 43 and rectangular plates 44 is used to reduce side-to-side play or twisting of the boot 12 along its vertical axis. This insures that the foot 16 follows more precisely in the wake of the furrow created by the knife 11.

The single press wheel 42 may be mounted to the rear of the seed planter 12 by means of a bracket 48. The bracket 48 includes two arms (one arm 49 is shown in phantom in FIG. 1), one on either side of the wheel. Each arm is then bolted through an aperture 40 onto bracket 30.

FIGS. 2 and 3 show the seed planter attachment of FIG. 1 with dual guage depth wheels 50 and 52 attached. In all other resects the identical components of FIG. 1 are utilized. The dual guage wheels 50 and 52 are connected to the bracket 30 by an elongate bolt 54 which engages a pair of apertures 40 on either side of bracket 30. Separating the wheels 50 and 52 from the bracket 30 are a pair of spacers 54 and 56, respectively which keep the wheels 50 and 52 spaced apart from the bracket 30 so as not to interfere with the leaf spring rods 20a and 20b.

The seed planter attachment illustrated in FIGS. 1, 2 and 3 may be adjusted in a variety of ways depending upon soil conditions and the type of cultivation to be performed. In general the weight or pressure of the press wheel 42, for example, may be set through a combination of the choice of apertures 40 for attachment of the bracket 48 holding the wheel 42 and the location along the chisel plow 10 where the bracket 22 is fastened. Generally, the leaf spring rods 20 will be fastened to the bracket 30 through apertures 40 which provide an initial setting of the depth of the boot 12. Thereafter, however, the depth of the boot may be quickly changed in the field without disassembling the gauge wheel bracket 48 or readjusting the position of the angle bracket 22 with respect to chisel plow 10. If seed planter depth is to be altered all that is necessary is to pull the pin 38 through tabs 34 and 36 to detach the bracket 30, and to reinsert pin 38 through tabs 34 and 36 after these have been inserted in a different set of apertures 33, higher or lower as desired. In this way an adjustment can be made in the field without loosening or having to reattach small attaching parts such as nuts, bolts and screws.

Another advantage of the present invention is the ability to adjust the position of the boot 12 lengthwise along the spring rods 20a and 20b. Since a double set of U-bolts 43 and rectangular plates 44 are used on bracket 30, the boot 12 may be slid lengthwise, that is, away from the chisel plow 10 along spring rods 20a and 20b to any desired distance along their upper straight portions. In this way the distance between the fertilizer injected into the soil through knife 11 and the seeds deposited through cylinder 14 can be regulated. This enables the soil to fill in on top of the fertilizer in the wake of knife 11 and allows it to be pressed into the ground by the shape of foot 16 prior the deposit of a seed thereon. In this way the fertilizer is kept separate from the seed and will not "burn" the seed. On the other hand for other applications it may be desirable to have the seed planter as close as possible to the knife 11 and in such a case the configuration illustrated in the preferred embodiment of FIG. 1 will be used. When adjusting the distance between the foot 16 and the knife 11 it is merely necessary to loosen bolts 43 enough to allow the boot 12 to slide along spring rods 20a and 20b.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A seed planter, for attachment to a vertically oriented plow shank, comprising:
   (a) a plow shank;
   (b) a hollow seed guide having a ground engaging boot;
   (c) leaf spring rod means coupled to said plow shank for supporting said seed guide in rear trailing relation relative to said plow shank;
   (d) a bracket means;
   (e) wheel means, said wheel means and said leaf spring rod means connected to said bracket means at a predetermined vertical height relative to said plow shank, said bracket means vertically supporting said seed guide; and
   (f) said bracket means including means for selectively detachably coupling to said seed guide at predetermined vertical intervals along the length thereof for connecting said wheel means and said leaf spring rod means to said seed guide, whereby said boot may be regulated in vertical heighth independently of the connection of the wheel means and the leaf spring rod means.

2. The seed planter attachment of claim 1 wherein said hollow seed guide includes a flat plate fixedly mounted to the rear thereof and having tab means affixed thereto for engaging said bracket means.

3. The seed planter attachment of claim 2 wherein said tab means for engaging said bracket means comprises a pair of tabs insertable through slotted apertures in said bracket means, said tabs having vertically-aligned apertures, and an elongate pin insertable through said apertures for holding said bracket means snugly against said plate.

4. The seed planter attachment of claim 1 wherein said boot includes a crescent-shaped foot.

5. The seed planter attachment of claim 1, wherein said bracket includes means for selective adjustment along said leaf spring rods relative to said plow shank.

6. The seed planter attachment of claim 5 wherein said wheel means comprises dual depth guage wheels connected to said bracket by a bolt insertable through apertures on at least one side of said bracket means.

7. The seed planter attachment of claim 5 wherein said wheel means comprises a single press wheel attached to said bracket in rear trailing relation.

* * * * *

UNITED STATES PATENT AND TRADEMARK OFFICE
CERTIFICATE OF CORRECTION

PATENT NO. : 4,691,645

DATED : September 8, 1987

INVENTOR(S) : Steven Anderson

It is certified that error appears in the above-identified patent and that said Letters Patent is hereby corrected as shown below:

Col. 2, line 66      Change "dul" to --dual--

Col. 4, line  9      Change "resects" to --respects--

Signed and Sealed this

Thirty-first Day of May, 1988

Attest:

DONALD J. QUIGG

Attesting Officer

Commissioner of Patents and Trademarks